April 6, 1954
A. L. BAKER
2,674,044
SURVEYING INSTRUMENT
Filed July 9, 1951
3 Sheets-Sheet 1
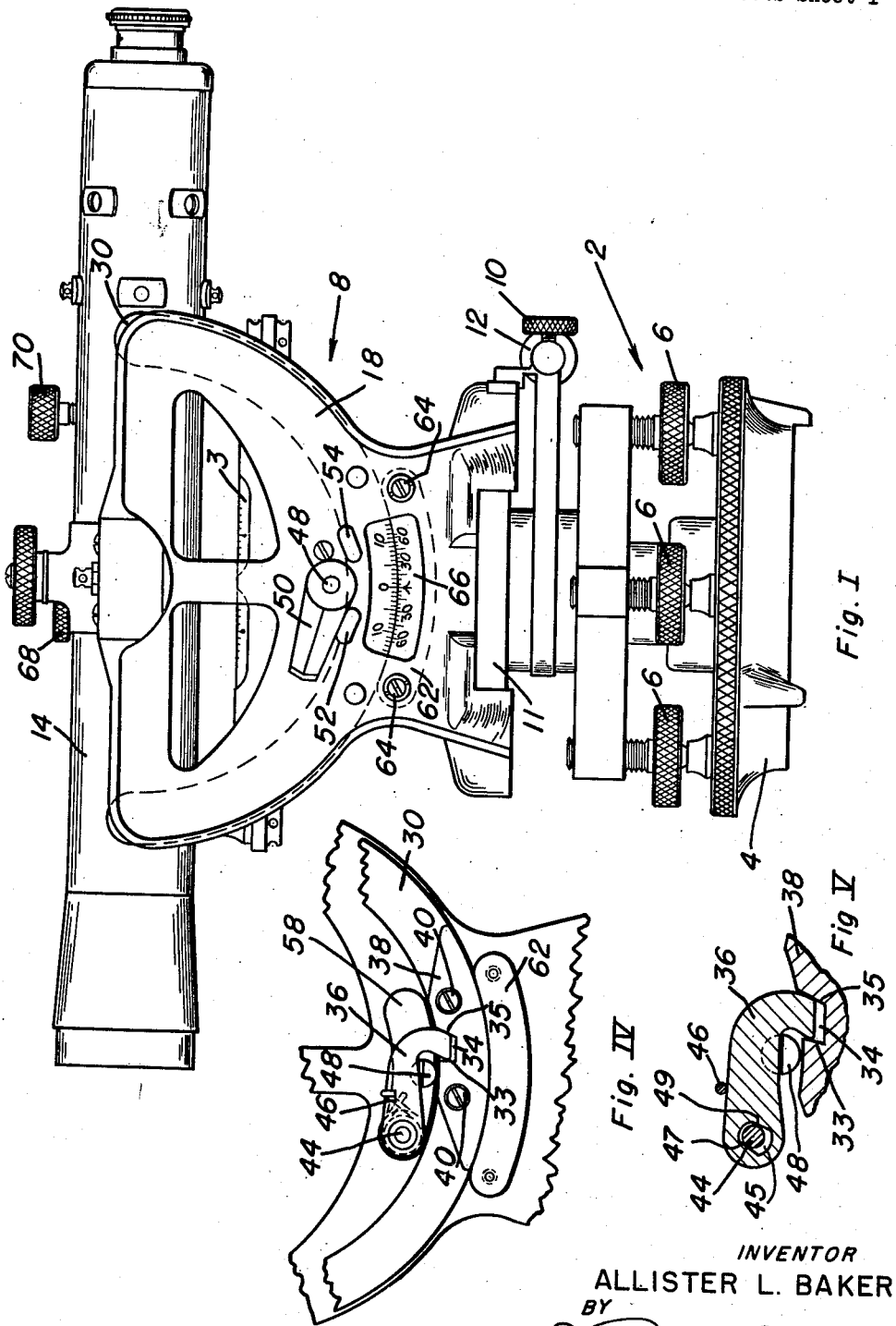
INVENTOR
ALLISTER L. BAKER
BY
ATTORNEY

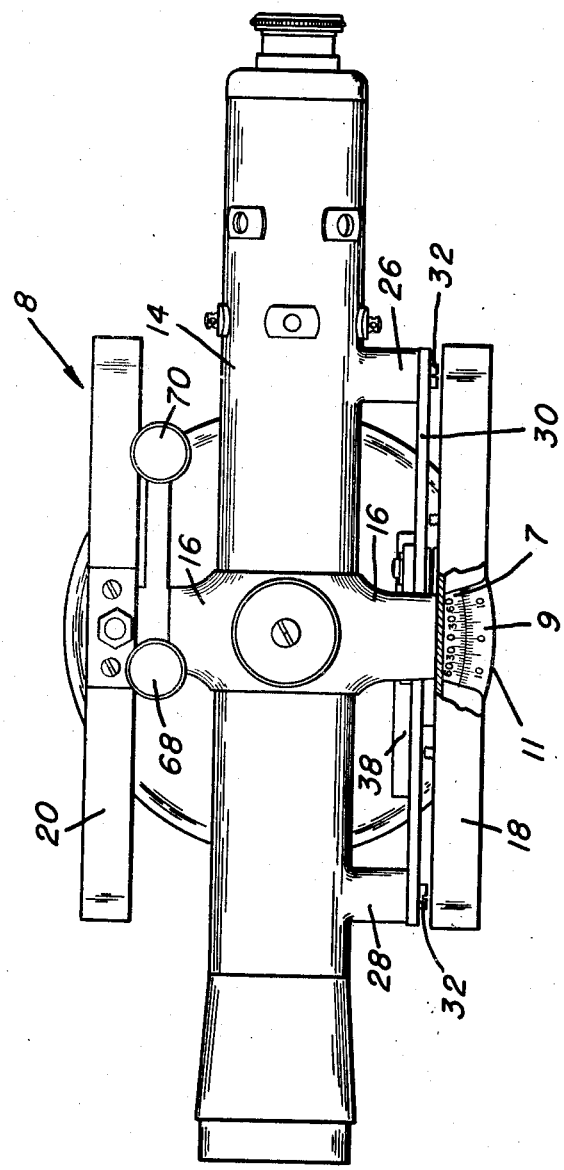
Fig. II
INVENTOR
ALLISTER L. BAKER
BY
ATTORNEY

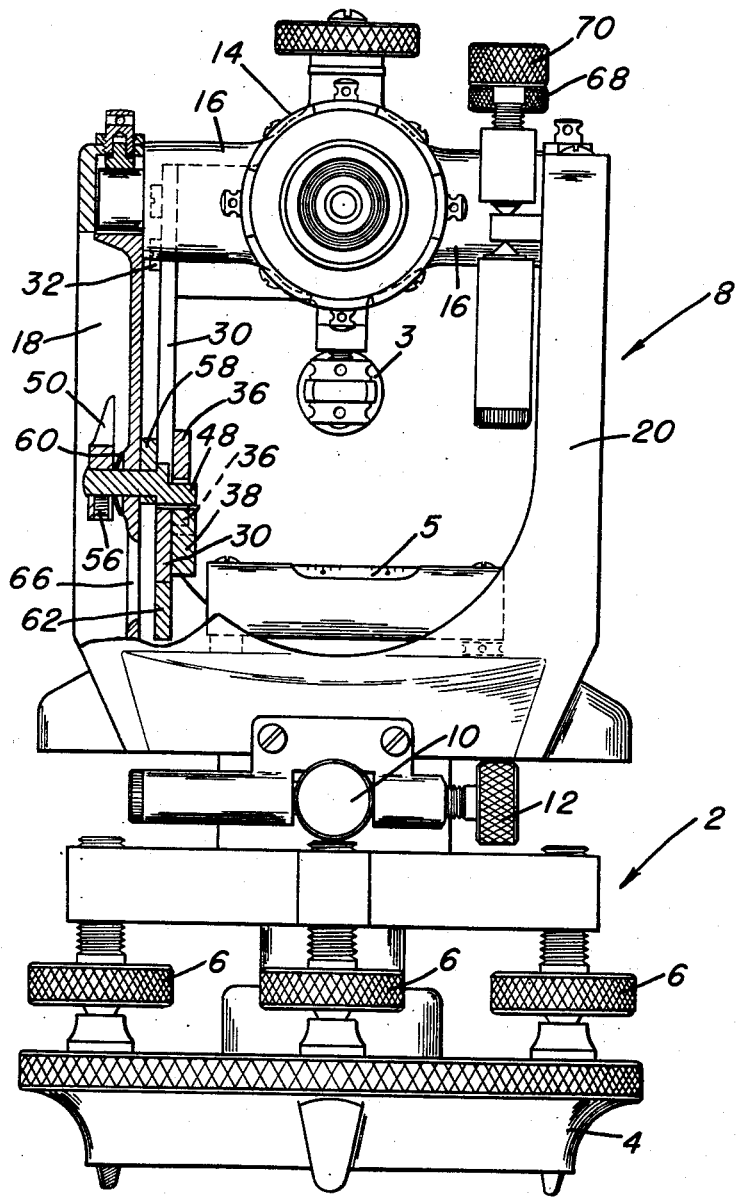
Fig. III
INVENTOR
ALLISTER L. BAKER

Patented Apr. 6, 1954

2,674,044

UNITED STATES PATENT OFFICE 2,674,044

SURVEYING INSTRUMENT

Allister L. Baker, Denville, N. J., assignor to Keuffel & Esser Company, Hoboken, N. J., a corporation of New Jersey Application July 9, 1951, Serial No. 235,844

5 Claims. (Cl. 33—70)

This invention relates to a type of surveying instrument frequently used in building work. It is a further improvement over the structure disclosed in copending application Ser. No. 790,902 filed December 10, 1947. This type of instrument is chiefly used as a level but is also provided with means for reading horizontal and vertical angles.

The construction about to be described has an advantage over the construction described in the above identified patent application in that if the locking pawl should wear, play will not develop in the motion of the telescope when the pawl is in locking position.

The principal objects of the invention are to provide a simple, rigid, non-straining means for readily locking the telescope in the horizontal position when the instrument is to be used as a level, which means is self correcting in the event of wear.

These and other objects of the invention and the means for their attainment will be apparent to those skilled in the art from the following description taken in connection with the accompanying drawings in which:

Figure I is a view in elevation showing the improved instrument.

Figure II is a view in plan showing the improved instrument.

Figure III is a view in front elevation showing the improved instrument.

Figure IV is a view in elevation showing the locking means looking in the opposite direction from Figure I from a point between the standards of the instrument.

Figure V is a view similar to Figure IV but showing only the locking means in enlarged size.

Referring to the drawings, Figs. I, II and III, a levelling head 2 is provided by means of which the instrument may be fastened to a tripod not shown and levelled thereon. The base plate 4 is provided with an internal thread which fits a similar thread on the tripod. The four levelling screws 6 and either the plate level vial 5 or the telescope level vial 3 are used for levelling up the instrument. The alidade 8 is fastened to a center spindle not shown so that it may be turned about the levelling head. The alidade 8 carries a vernier 7 mounted adjacent to the horizontal scale 9 provided on the limb plate 11. The vernier 7 and horizontal scale 9 are used to read the horizontal position of the telescope 14, carried by the alidade 8. A clamp operated by the knurled headed screw 10 clamps the alidade 8 in any selected position and the tangent screw 12 is provided for fine adjustment of the alidade's position in azimuth. The construction of these aforementioned parts may all be in accord with designs well known in the art.

The telescope 14 is rotatably mounted on the alidade 8 by means of the horizontal telescope axle 16. In the embodiment shown the telescope 14 rotates through an angle of about 90° but the design may be changed at will to permit greater or less rotation depending on the use to which the instrument is to be put. The axle 16 rests in conventional V-bearings provided therefor in each of the standards 18 and 20 of the alidade 8.

Two projections 26 and 28 extending parallel to the telescope axle 16 are integrally cast with the telescope tube 14. The telescope level vial 3 is adjustably mounted on two similar integrally cast projections extending downward from the telescope tube. The arcuate member 30 is secured to the projections 26 and 28 at both of its ends as by the screws 32 so that it takes a vertical position adjacent to standard 18. A locking piece 38 is secured to the inside surface of the arcuate member 30 by screws 40 (see Fig. IV). The locking piece 38 is provided with an opening 34 extending substantially radial to the arcuate member 30. A locking pawl 36 is pivoted on axle 44 perpendicular to the standard 18. Resilient means in the form of the spring 46 urges the free end of the locking pawl 36 into engagement with the opening 34 in the locking member 38 and at the same time urges the inclined walls of the opening 45 into contact with the axle 44. One end of the spring 46 hooks around the upper edge of the locking pawl 36, the spring then passes around the axle 44 between the locking pawl 36 and the standard 18 and the other end of the spring is anchored to the standard 18 as by passing it through a hole in the standard 18.

The cam 48 also pivots about an axis perpendicular to the standard 18 and is manually operated by means of the lever arm 50. The cam 48 is in the form of a semi-cylinder pivoted about its axis. The semi-cylindrical cam 48 may be formed by cutting one end of a rod at a plane passing through its axis (i. e. the end of the rod which extends between the standards 18 and 20). The other end of the rod 48 has a reduced diameter (Fig. III) which passes through the standard 18 and through a reenforcing piece 58 secured to the inside of standard 18. (The reenforcing piece 58 may for example be secured by 2 screws not shown.) A shoulder is formed on the rod 48 where the reduced diameter portion begins. This shoulder rests against the surface of reenforcing piece 58. The lever arm 50 fits over the reduced portion of cam rod 48 which extends outward beyond standard 18. The lever arm 50 is firmly secured to the cam rod 48 as by means of a set screw 56. The spring washer 60 fits over the cam rod 48 and is placed between the lever arm 50 and a boss on standard 18. The action of the spring washer 60 holds the shoulder on rod 48 against the surface of reenforcing piece 58.

Two stops 52 and 54 (see Fig. I) provided on the outside of standard 18 limit the motion of the lever arm. The lever arm 50 is joined to the cam rod 48 in such a manner that when the lever arm 50 is against stop 52 (as shown in Fig. I), the cut-away portion of the cam 48 will be up (as shown in Fig. III) so that the locking lever 36 will be free to move downward under the action of spring 46. The free end of locking pawl 36 which extends substantially at right angles to the body thereof will then be urged against the upper arcuate edge of the locking piece 38 and (if the telescope is in its horizontal position) into opening 34 in the locking piece 38. At the upper edge of locking piece 38, the opening 34 therein is larger in cross section than the free end of the locking pawl 36. The opening 34 becomes progressively smaller in cross section from the upper edge of locking piece 38 to the innermost part of the opening. The opening 34 is smaller in cross section than locking pawl 36 at its innermost part. When the free end of the locking piece 36 is urged into the opening 34 under the action of spring 46 it comes to rest at the position where the cross section of opening 34 is equal to its own cross section. This action locates and locks the arcuate member 30 and thereby the telescope 14 in a definite position without play. The locking piece 38 is adjustable along the arcuate member 30. This is accomplished very simply by providing oversized holes for the screws 40. The locking piece 38 is factory adjusted so that the telescope sights in a truly horizontal direction when the pawl 36 is in locked position and the instrument is properly levelled.

When the lever arm 50 is turned to the other extreme, until it comes in contact with stop 54, the cam 48 will also be turned approximately 180° so that its semi-cylindrical surface will contact the locking pawl 36 and raise the free end thereof out of contact with locking piece 38 against the action of the spring 46.

The opening 34 is preferably formed so that the walls 33 and 35 are inclined to lines in the plane shown in Fig. V drawn perpendicular to radii from the center of the axle 44 to the points of contact between the pawl 36 and the walls 33 and 35. The inclination of both walls is in a direction such as to make the opening 34 larger at the top than at the bottom. Preferably the inclination angles of the walls with the lines drawn perpendicular to the aforementioned radii are small and equal to each other so that it will be equally difficult to disengage the pawl by pushing on one end or the other of the telescope. The free end of the locking pawl 36 is rounded so as to be substantially tangent to the walls 33 and 35 and so as to make substantially line contact with these walls. Thus the wear of the contacting surfaces is held to a minimum and the wear on both walls and on both of the engaging surfaces of the pawl 36 tends to be the same so that the locked position of the telescope will not be changed.

"Play" between the axle 44 and the cooperating opening 45 in the pawl 36 is also compensated by the construction shown in Figure V. The opening 45 in the locking pawl 36 is provided with two walls 47 and 49 which make an angle with each other and engage the cylindrical surface of the axle 44. The spring 46 acts on the pawl 36 between the axle 44 and the free end of the pawl 36 which engages the opening 34. Thus the spring 46 holds the walls 47 and 49 of the opening 45 in contact with the cylindrical surface of axle 44 at the same time that it holds the free end of the locking pawl 36 in the opening 34.

Wear of the walls 47 and 49 or of the axle 44 will only permit the axle 44 to fit further into the angle formed by the walls 47 and 49 and will not interfere with the positive locking action of the pawl 36. Since the walls 47 and 49 will tend to wear equally, the locked position of the telescope will not be changed. In the event that the locked position of the telescope should change slightly after a long period of use of the instrument, it can be corrected by readjusting the locking piece 38. Due to the fact that the locking pawl is actuated by a spring and that the walls of the opening 34 are inclined as described, the telescope may become disengaged from its locked position should it be acted upon by an unusual force or blow. This feature will tend to protect the parts from damage.

The upper edge of the locking piece 38 is substantially parallel to the upper arcuate edge of the arcuate member 30 in the region of the opening 34. At the ends of locking piece 38, this edge inclines away from the axle 16. Thus if the telescope is elevated or depressed so that the free end of locking pawl 36 is beyond the ends of locking piece 38, with the lever arm 50 in the position shown, the telescope may be brought into its horizontal position and locked there merely by turning the telescope so that the free end of the locking pawl 36 follows the inclined edge of the locking piece 38 and then the parallel edge and finally engages the opening 34.

A vernier scale 62 is mounted to the inside surface of standard 18 adjacent to the arcuate member 30 by means of screws 64. The vernier divisions extend inward from the upper edge of the vernier scale 62. Protractor scale divisions are provided on the surface of arcuate member 30 facing the standard 18 and extend from the lower arcuate edge thereof so that they cooperate with the vernier divisions. The vernier scale 62 is factory adjusted to make the zero reading correspond to the horizontal position of the telescope. This adjustment is conveniently provided by making the holes in standard 18 for the screws 64 oversize. An opening 66 is provided in the standard 18 for reading the vertical protractor scale. The vertical protractor readings indicate the elevation or depression of the telescope.

A clamp 68 and tangent screw 70 are provided for use when the locking pawl 36 is disengaged. The telescope 14 can be inclined in any direction and clamped by means of clamp 68. Tangent screw 70 then affords a fine adjustment. The clamp 68 should always be open when the locking pawl 36 engages the opening 34 so that it cannot affect the centering of the pawl in the opening.

Having thus described the invention, what is claimed is:

1. In a surveying instrument having an alidade rotating around a vertical axis and including a standard carrying a telescope at least partially rotatable around a horizontal axis, the combination comprising an arcuate member adjacent to said standard secured to said telescope, divergent walls carried by said arcuate member inclined to provide an opening of decreasing cross section, a locking pawl having a rounded free end pivoted about an axis perpendicular to said standard, resilient means urging the rounded free end of said locking pawl toward said arcuate member into the opening provided by said walls, said walls being outwardly inclined at a small angle with respect to perpendiculars to radii from the axis about which said locking pawl is pivoted to the places where the rounded free end of said pawl contacts said walls, said rounded free end of said locking pawl being substantially tangent to said walls at the places of contact, and a manually operable cam for holding said locking pawl out of engagement with said opening carried by said arcuate member when it is desired to turn the telescope around its horizontal axis.

2. In a surveying instrument having an alidade rotatable around a vertical axis and including two standards carrying a telescope at least partially rotatable around a horizontal axis, the combination comprising an arcuate member adjacent to one of said standards secured to said telescope at both of its ends, a protractor scale provided on a surface of said arcuate member and extending from an arcuate edge thereof, a vernier scale secured to said standard adjacent to said protractor scale, means carried by said arcuate member having divergent walls inclined to provide an opening of decreasing cross section extending from the other arcuate edge of said arcuate member, a locking pawl having a rounded free end pivoted about an axis perpendicular to said standard, resilient means urging the rounded free end of said locking pawl against said means carried by said arcuate member into the opening therein, said walls being outwardly inclined at a small angle with respect to perpendiculars to radii from the axis about which said locking pawl is pivoted to the places where the rounded free end of said pawl contacts said walls, said rounded free end of said locking pawl being substantially tangent to said walls at the places of contact, a cam pivoted about an axis perpendicular to said standard for holding said locking pawl out of engagement with said means carried by said arcuate member when it is desired to turn the telescope around its horizontal axis and a lever arm for operating said cam.

3. In a surveying instrument having an alidade rotatable around a vertical axis and including two standards carrying a telescope at least partially rotatable around a horizontal axis, the combination comprising an arcuate member adjacent to one of said standards secured to said telescope at both of its ends, means carried by said arcuate member having an edge substantially parallel to an arcuate edge of said arcuate member and having divergent walls inclined to provide an opening of decreasing cross section extending from said parallel edge, a locking pawl having a rounded free end extending substantially at right angles to the body thereof pivoted about an axis perpendicular to said standard, resilient means urging the rounded free end of said locking pawl against said parallel edge of said means carried by said arcuate member into the opening therein, said walls being outwardly inclined at a small angle with respect to perpendiculars to radii from the axis about which said locking pawl is pivoted to the places where the rounded free end of said pawl contacts said walls, said rounded free end of said locking pawl being substantially tangent to said walls at the places of contact, the opening in said means carried by said arcuate member being larger in cross section than said free end of said locking pawl at said parallel edge, becoming progressively smaller in cross section from said arcuate edge to the innermost part of the opening and being smaller in cross section than said free end of said locking pawl at the innermost part of the opening so that the action of said resilient means on said pawl will lock said pawl in the opening without play when said telescope is in a horizontal position and a manually operable cam for holding said locking pawl out of engagement with said arcuate member when it is desired to turn the telescope around its horizontal axis.

4. In a surveying instrument having an alidade rotatable around a vertical axis and including a standard carrying a telescope at least partially rotatable around a horizontal axis, the combination comprising an arcuate member adjacent to said standard secured to said telescope, divergent walls carried by said arcuate member inclined to provide an opening of decreasing cross section, a locking pawl having walls making an angle with each other, an axle carried by said standard between said walls of said locking pawl, resilient means urging a free end of said locking pawl toward said arcuate member and into the opening provided by said walls carried by said arcuate member and also urging said walls of said locking pawl into engagement with said axle and a manually operable cam for holding said locking pawl out of engagement with said walls carried by said arcuate member when it is desired to turn the telescope around its horizontal axis.

5. In a surveying instrument having an alidade rotatable around a vertical axis and including a standard carrying a telescope at least partially rotatable round a horizontal axis, the combination comprising an arcuate member adjacent to said standard secured to said telescope, a locking pawl having walls making an angle with each other near one end thereof and having a rounded free end extending substantially at right angles to the body thereof, an axle parallel to the horizontal axis of the instrument carried by said standard between said walls of said locking pawl, divergent walls carried by said arcuate member oppositely inclined to a perpendicular to a radius extending from the axis of said axle, resilient means urging the free end of said locking pawl into the opening provided by said divergent walls and also urging said walls of said locking pawl into engagement with said axle and a manually operable cam for holding said locking pawl out of engagement with said walls carried by said arcuate member when it is desired to turn the telescope around its horizontal axis.

References Cited in the file of this patent

UNITED STATES PATENTS

| Number | Name | Date |
|---|---|---|
| 234,284 | Jackson | Nov. 9, 1880 |
| 552,751 | Denison | Jan. 7, 1896 |
| 1,710,057 | Heinrich | Apr. 23, 1929 |
| 1,953,804 | Hayes | Apr. 3, 1934 |

FOREIGN PATENTS

| Number | Country | Date |
|---|---|---|
| 14,168 | Great Britain | July 24, 1894 |
| 322,497 | Great Britain | Dec. 6, 1929 |